Feb. 7, 1967 R. J. STUCKEL 3,302,650

AUTOMATIC DEMAGNETIZER FOR MAGNETIC TRAY

Filed July 7, 1964 4 Sheets-Sheet 1

INVENTOR
Robert J. Stuckel
BY
Olson, Trexler
Wolters & Bushnell attys

AUTOMATIC DEMAGNETIZER FOR MAGNETIC TRAY

Filed July 7, 1964 4 Sheets-Sheet 2

Inventor
Robert J. Stuckel
By: Olson, Trexler, Wolters & Bushnell
Attys.

Feb. 7, 1967 R. J. STUCKEL 3,302,650

AUTOMATIC DEMAGNETIZER FOR MAGNETIC TRAY

Filed July 7, 1964 4 Sheets-Sheet 3

INVENTOR.
Robert J. Stuckel
BY
Olson, Trexler
Wolters & Bushnell Attys

AUTOMATIC DEMAGNETIZER FOR MAGNETIC TRAY

Filed July 7, 1964 4 Sheets-Sheet 4

Inventor
Robert J. Stuckel

By: Olson, Trexler, Wolters & Bushnell attys.

United States Patent Office 3,302,650
Patented Feb. 7, 1967

3,302,650
AUTOMATIC DEMAGNETIZER FOR MAGNETIC TRAY

Robert J. Stuckel, Mount Prospect, Ill., assignor to Business Efficiency Aids, Inc., Skokie, Ill., a corporation of Illinois Filed July 7, 1964, Ser. No. 380,848
8 Claims. (Cl. 129—16)

The present invention relates to a magnetic card filing device and more particularly to an improvement in magnetic card filing devices utilizing magnetic force to cause a separation of fanning out of a plurality of magnetic cards disposed in a tray. More specifically, the present invention relates to a magnetic card filing device wherein demagnetizing means are provided permitting the magnetic cards to be collapsed from their fanned out position to mark the place from which a card is removed.

The magnetic card filing devices to which the present invention relates are generally well known in the art, one example of which contemplates a filing tray formed of a nonmagnetic material and having end walls which are inclined outwardly from the bottom to the top so that the tray sides are longer at the top than at the bottom, permitting magnetic cards stored within the tray to separate or fan out adjacent their upper edges. The magnetic cards are provided with magnetic portions such as thin pieces of soft iron laminated on either side of a card between two thicknesses of card stock. A permanent bar magnet is positioned on each side of the tray extending longitudinally between the ends of the tray, the magnets being located adjacent the magnetic portions of the cards.

Each card tray has a plurality of nonmagnetic dividers positioned between a predetermined number of cards. To secure a filing card from a particular section, the preceding divider is pulled toward the forward end of the tray creating a V-shaped opening within the tray defined by the divider pulled forward and the subsequent cards.

The permanent bar magnets in the tray magnetize the soft pieces of iron in the cards and the cards fan out in the V-shaped opening due to the magnetic repulsion effect between adjacent card inserts.

With cards in a section in a fanned out position, they may be easily viewed and the exact filing card desired removed from the tray. While the fan out position is most desirable for selection of a card, this position makes it relatively difficult to refile a card after use. If it were possible to readily collapse the cards on either side of a card removed, this would mark the exact spot for refiling of a card removed and greatly simplify and accelerate the card removal and refiling operation.

Therefore, it is a general object of the present invention to provide an improved magnetic card filing device.

It is a further object to provide a magnetic card filing device with a simple means for collapsing cards from a fanned out position.

Another object is to provide a magnetic card filing device having a simple exceptionally responsive, manually operable means for collapsing cards from a fanned out position.

Another object is to provide a magnetic card filing device having hand support means to support an operator's hand and assist an operator in locating a particular filing card desired to increase the efficiency of the card selection operation.

A related object is to provide such a device wherein the hand support means comprises a card collapse means wherein a slight downward pressure of the hand on the support means decreases the intensity of the magnetic field on one side of the device to permit collapsing of the cards from a fanned out position.

A further object is to provide such a magnetic card filing device wherein the intensity of the magnetic field on one side of the tray may be readily varied.

A related object is to provide means in a magnetic card filing device wherein the intensity of the magnetic field may be readily varied and automatically maintained at a particular predetermined intensity.

Another object is to provide an improved magnetic card filing device wherein card collapsing means are provided to decrease the intensity of the magnetic field on one side of the tray and to automatically maintain that particular magnetic field intensity, the demagnetization or decrease of magnetic field intensity being sufficient to permit collapse of cards from a fanned out position.

Another object is to provide a magnetic filing device having card collapsing means wherein the same hand movement of the operator in replacing a filing card in position automatically reactivates the magnetic field and causes the cards to return to a fanned out position.

Another object is to provide a magnetic card filing device with means for collapsing magnetic cards within the tray from a fanned out position while the edges of cards on one side of the tray are magnetically gripped in collapsed position against the side of the tray and to provide means for readily fanning out the cards again after a card selected has been refiled.

These and other objects of the invention will be apparent from the following description taken in conjunction with the appended claims and accompanying drawings wherein like parts are identified by like numerals and wherein:

FIGS. 1 and 2 are perspective views of an embodiment of the present invention showing magnetic filing cards in fanned out position in FIG. 1 and in a collapsed position in FIG. 2;

FIGS. 3 and 4 are end elevational views in section taken along lines 3—3 and 4—4 of FIGS. 1 and 2 respectively;

FIGS. 5 and 6 are side elevational views in section taken along lines 5—5 and 6—6 of FIGS. 3 and 4 respectively, showing the automatic card collapsing means of the present invention;

FIGS. 7 and 8 are perspective views of demagnetization assembly with the components separated in FIG. 7 to show their relationship, and with the components joined in FIG. 8 to show their manner of assembly.

*Detailed description of the invention*

Figures 1, 2:
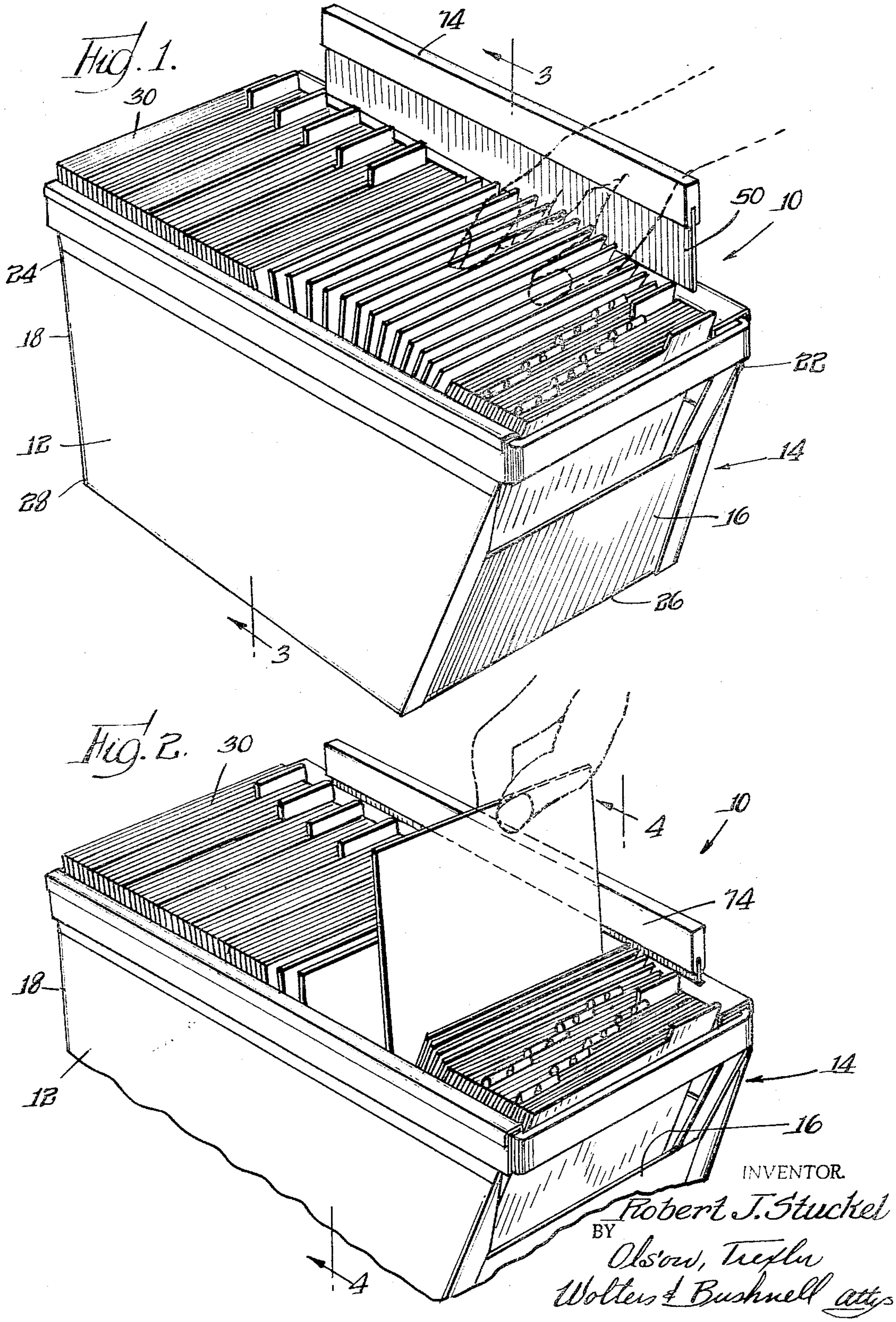

Referring to FIGS. 1–4, a magnetic filing tray 10 is shown comprising side walls 12, 14, a front end 16, a rear end 18 and a bottom 20, all of which are formed of a nonmagnetic material such as aluminum or the like. The front and rear ends 16, 18 have their top edges 22, 24 inclined outwardly with respect to the bottom edges 26, 28, as may best be seen in FIGS. 5, 6. The outwardly inclined ends permit magnetic filing cards 30, FIGS. 1, 2, within the magnetic trays to separate or fan out adjacent their upper edges.

Figures 3, 4:
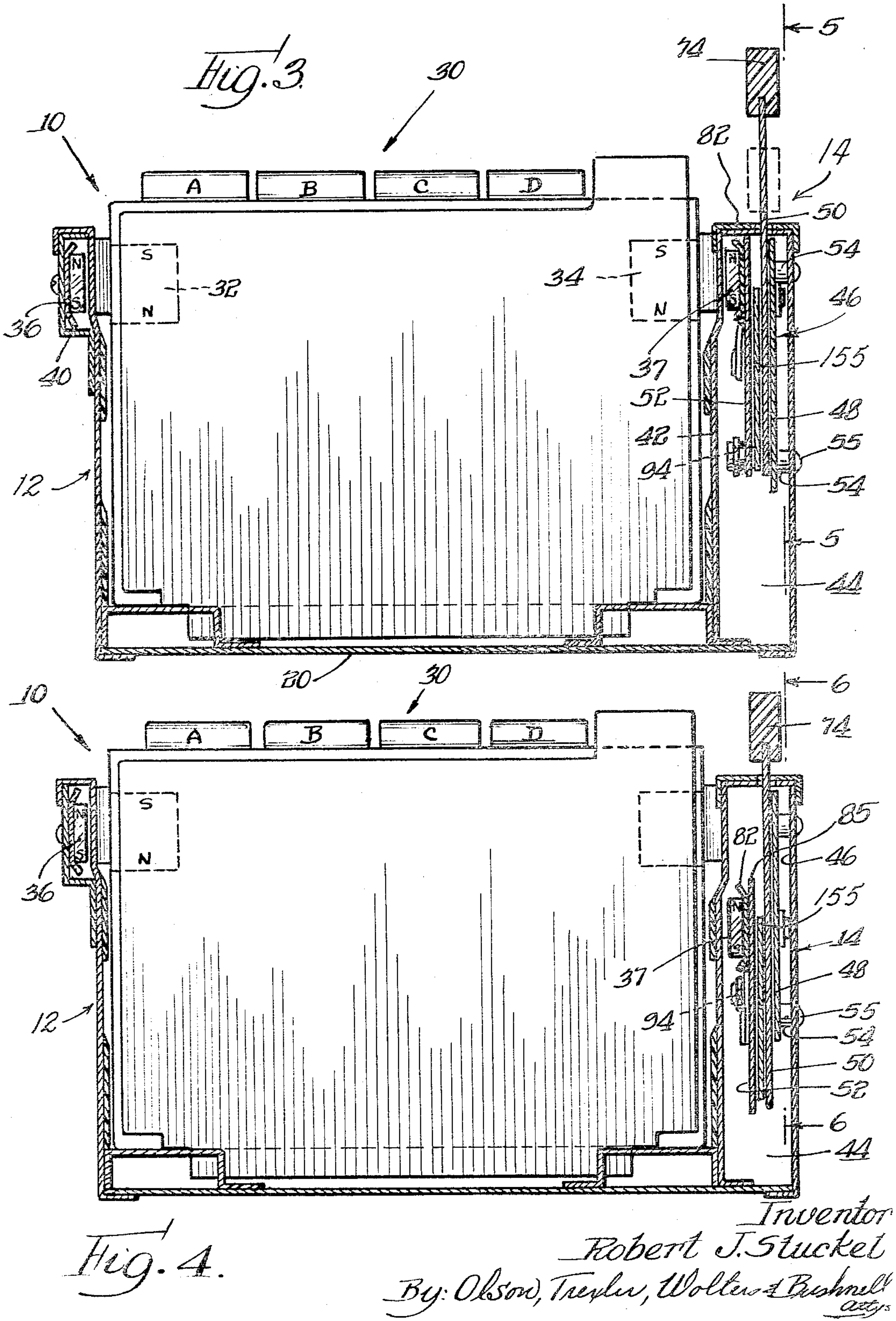

The magnetic filing cards 30, FIGS. 3, 4, are utilizable for customer records, sales records, personnel records, and the like and include magnetic inserts comprising thin pieces of soft iron 32, 34 laminated within the cards on both sides of the cards adjacent their tops.

A plurality of bar magnets 36, 37, FIGS. 3, 4, are included within the magnetic tray extending generally horizontally on each side of the tray. The bar magnets are not of conventional construction with opposite poles at opposite ends, but are provided with opposite poles along opposite edges, for instance, with a north pole along the top edge and a south pole along the bottom edge as indicated in FIG. 3.

The bar magnets induce like poles along all the top edges of the tabs 32 adjacent the magnets and like poles along all the bottom edges of the tabs. South poles are induced in the top edges of the tabs adjacent the north poles of the magnets; and north poles are induced in the bottom edges of the tabs adjacent the south poles of the bar magnets.

Thus, adjacent portions of adjacent tabs are similarly polarized. It is a known phenomenon that like poles repel like poles and this phenomenon causes the cards 38 to spread apart or fan out adjacent their upper edges where they are readily viewed and may be quickly removed from the tray, as seen in FIG. 1.

The bar magnets 36, FIG. 3, on the one side of the tray are fixedly secured to the side 12 by suitable mounting brackets 40. A magnetic assembly is provided on the other side of the tray with an inner side wall 42 spaced from side 14 to form a longitudinal chamber 44 to contain bar magnets 37 and an automatic card collapse means or demagnetization assembly designated generally by the numeral 46, to which the bar magnets 37 are secured.

The automatic demagnetization assembly 46, FIGS. 3–4, include an outer fixed plate 48, a center plate 50 and an inner plate 52. Outer plate 48 is fixedly secured to the side 14 of the tray by suitable mounting means, such as, internally threaded mounting studs 54 secured to the outer face of the plate 48 for receipt of threaded bolts 55 to hold plate 48 in spaced relationship to side 14.

Figures 7, 8:
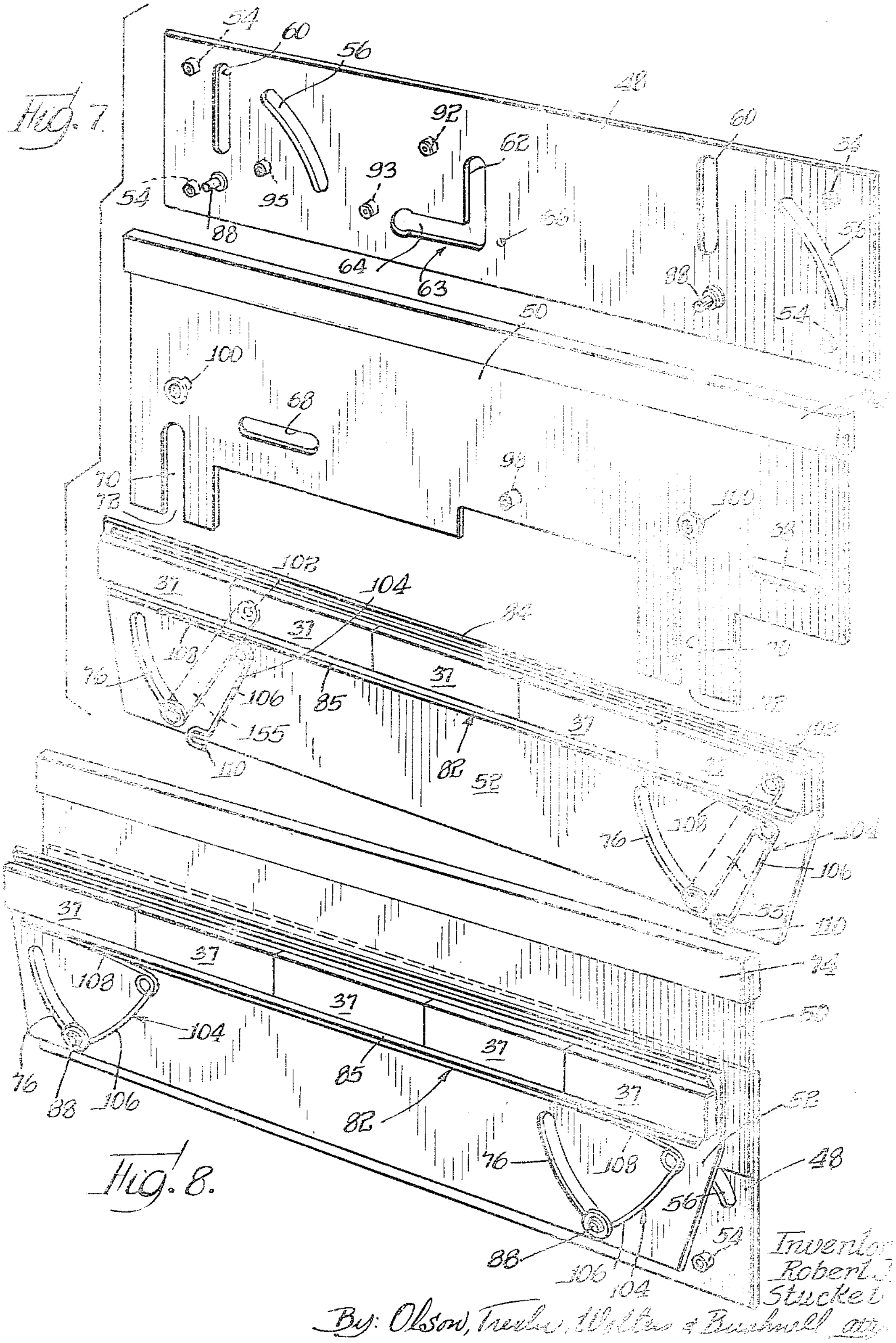

Referring now to FIGS. 7, 8, outer plate 48 has a plurality of arcuate grooves or slots 56 extending downwardly in the plate about a relatively lower center of radius, not shown. A plurality of generally vertical outer slots 60 and an intermediate substantially vertical slot 62 which is one leg of an L-shaped slot or opening 63 having another leg comprising a substantially horizontal slot or opening 64 to contain a spring are also provided in the plate 48. A generally circular opening 66 is provided adjacent the lower end of the vertical leg 62 for receipt of one end of a spring to be hereafter described.

Outer plate 48 has a plurality of forwardly directed studs 88 adapted to move slidingly within guideways 70 in the center plate and in arcuate openings 76 in the inner plate respectively. Means for joining the plates 48, 50, 52 together cooperatively are also provided on outer plate 48, comprising an outer button or stud 92 between the legs of opening 63 and a similar button or stud 93 adjacent the horizontal leg 64 of opening 63 opposite to circular opening 66. The studs 92, 93 are adapted for receipt of various camming and locking means to be hereafter described, the buttons being generally cylindrical in shape and having a circumferential groove 94, FIGS. 3–4 adapted for receipt of holding or retaining washers.

Center plate 50 has a plurality of substantially horizontal channels or cut out portions 68, a plurality of substantially vertical guideways 70 with an open lower end 72. A horizontal rail 74 rests on and encloses the upper portion of center plate 50 to form a hand support.

Center plate 50 has a rearwardly directed centrally positioned button or stud 98 and two upper buttons or studs 100, the studs being of generally cylindrical shape and having cylindrical grooves therein similar to the circumferential grooves in buttons 92 for the receipt of suitable retaining washers. Button 98 is positioned to fit operatively within vertical leg 62 of the outer plate. Cylindrical studs 100 are positioned generally in line with vertical guideways 70 and are adapted to fit slidingly within vertical slots 60 in the outer plate.

Inner plate 52 has a plurality of arcuate passageways or openings 76 extending arcuately about an upper center of radius, not shown. A conventional magnetic keeper 82 to direct the magnetic force of the magnets 37 inwardly is attached to plate 52 with the bar magnets 37 adhered thereto, the keeper being positioned adjacent an upper edge 84 of the plate in substantially horizontal position. A lower keeper edge 85 is turned inwardly partially supporting the magnets.

Inner plate 52 has two generally cylindrical rearwardly or outwardly directed studs 102 adapted to fit slidingly within horizontal channels 68 in the center plate and in arcuate grooves 56 in the outer plate, the studs each having a circumferential groove adjacent their outer ends adapted for receipt of a retaining washer.

Two generally V-shaped springs 104, FIGS. 7, 8, are provided to hold center plate 102 in a predetermined position, each spring having two legs 106, 108. A lower leg 106 has a looped end 110 adapted to fit over stud 88. An upper leg 108 is adapted to fit beneath the inwardly directed lower edge 85 of the keeper.

FIG. 8 shows an inner perspective view of the manner in which the three plates 48, 50, 52 are assembled, with the hand supporting rail on plate 50 shown in its upper position, the bar magnets secured to plate 52 also being in an upper position with respect to outer plate 48 with spring 104 in a relatively relaxed condition.

Figures 5, 6:
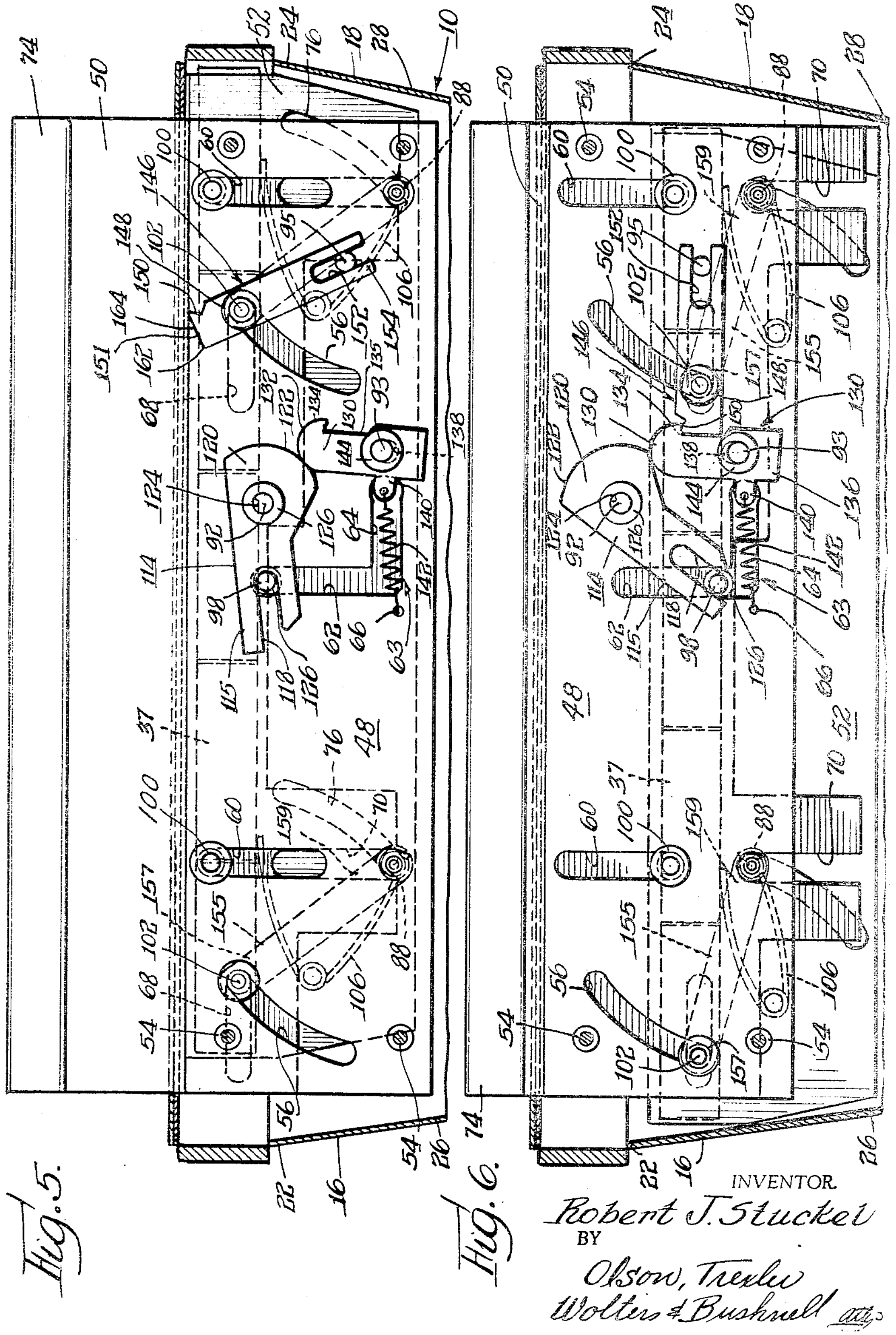

The manner in which the plates are assembled and their relationship to the magnetic tray is shown in FIGS. 5, 6. FIG. 5 shows the center plate in its upper, card magnetizing position in which the magnetic cards are fanned out as in FIG. 1.

FIG. 6 shows the assembly in demagnetizing card collapsing position with the center plate 50 in a down position with respect to the tray and the outer plate secured to the tray side with the magnets 37 secured to inner plate 52 in a lower demagnetizing position.

The outer side of the outer plate 48 is more clearly seen in FIGS. 5, 6 revealing the arcuate slots 56, the vertical slots 60 and L-shaped slot or opening 63, a camming lever 114, a hooked retaining head 130, and a locking arm 146 are operatively positioned on the outer side of the outer plate.

Camming lever 114 has an arm 115 having a slotted keyway or studway 118 adapted to receive circumferential stud 98 of the center plate for movement slidingly within the keyway. Stud 98 is positioned within the vertical leg 62 of the outer plate's L-shaped slot 63 with camming lever 114 secured in position about the stud by means of a retaining washer 126. The camming lever 114 has a camming head or cam 120 with a curvilinear edge 122 and a generally circular opening 124 therein adapted to receive the circumferentially grooved upper stud 92 of the center plate. A holding or retaining washer 126 is secured within the circumferential groove of the stud 92 to hold the camming lever to the outer plate for movement of the arm 115 pivotally about the button 92 as a center of rotation.

Hooked retaining head 130 has a curvilinear edge adapted to move slidingly in contact with the curvilinear edge of camming head 120. Head 130 also has a hook or beaked portion 134, a body 136 having a vertically extending slot 138 and a perforated finger 140 with a perforation therein. The perforated finger 140 is connected to one end of a spring 142 secured at its other end in an opening 66 in the outer plate. The slot 138 in the body of retaining head 130 is fitted about stud 93 adjacent the outer end 131 of the horizontal leg 64 of the L-shaped opening. A retaining washer 144 is positioned within the circumferential groove of the stud 93 to hold hooked retaining head 130 to the outer plate for movement of the head pivotally and vertically upwardly and downwardly about the stud.

A locking arm 146 is pivotally secured to the assembly about the circumferentially grooved inner plate stud 102 by a holding or retaining washer 148.

Locking arm 146 has a V-shaped mouth 150 adapted to engage the beak 134 of the head 130; and has a flat top 151 adapted to fit into a cutout portion 135 immediately below the beak of the head. Locking arm 146 also has a lower slideway 152 adapted to fit slidingly about outer stud or button 95 of the outer plate for movement pivotally and reciprocatingly about the stud. A holding or retaining washer fits within a circumferential groove of the button 95 to hold the arm 146 against the outer plate.

As best seen in FIG. 6, the two inwardly directed studs 88 of the outer plate are adapted to move within the arcuate groove 76 of the inner plate; and the two outwardly directed studs 102 of the inner plate are adapted to move within the arcuate grooves 56 of the outer plate. Two longitudinal linking arms or bars 155 having circular openings at their respective ends 157, 159 are positioned intermediate the inner plate and the center plate. The circular openings at the one end 157 of the bars fit around studs 102 of the inner plate; and the circular openings at the other end 159 of the bars 155 fit about the studs 88 of the outer plate to ensure a smooth movement of the studs 102, 88 within their respective arcuate slideways.

To assemble the three plates, inner plate 52 may be positioned on a horizontal support surface with the magnets facing down. Linking bars 155 are then positioned on the inner plate 52 with the openings at one end 157 of the bars about the upper studs 102. The other ends 159 are positioned with their openings generally in line with the arcuate openings 76 of the inner plate. Center plate 50 is then positioned above the inner plate with the inner plate's studs 102 protruding through the horizontal slots 68 of the center plate.

The outer plate is then positioned over the center plate, adjusting the ends 159 of the linking arms 150 to receive the inwardly directed studs 88 of the outer plate so that the studs fit within the arcuate grooves 76 and with the studs 102 of the inner plate extending upwardly through the arcuate grooves 56 of the outer plate. Camming lever 114 is then positioned over the outer plate with its keyway 118 about stud 98. Locking arm 146 is similarly positioned on the outer plate with its keyway 118 in position about stud 95. Retaining head 130 is similarly positioned over the outer plate with its slot fitting about stud 98 of the center plate. A spring 142 is secured in place within the horizontal leg 64 of the L-shaped opening with its one end connected to the opening in perforated finger 140 and its other end secured within opening 66 in the outer plate. Holding or retaining washers are then secured in place within the circumferential grooves in the studs or buttons from left to right in FIG. 6, 102, 100, 98, 92, 93, 102 and 95.

The entire assembly may then be turned over to set retaining washers in the circumferential grooves of studs 88. Springs 108 are secured in position in circumferentially grooved annular shaped grommets fitted around studs 88 with the upper spring legs 106 positioned in the groove beneath retaining plate 32. The resilient spring 108 urges studs 88 downwardly in the arcuate groove 76 with the bottom edges of plates 48 and 52 substantially in alignment as indicated in FIGS. 5 and 8. The hook end of the spring fits in the groove of the grommet which is adapted for movement pivotally about the stud 88 the grommet having an inner surface which moves slidingly against the surface of inner plate 52 about arcuate grooves 76.

*Operation of the invention*

The manner in which the demagnetization assembly operates is best seen in FIGS. 5, 6.

FIG. 6 shows the magnets in their up or magnetizing position. Outer plate 48 is fixedly secured to the side 14 of the tray. In this particular position, the rail 74 and the center plate 50 are also in their up position with the inner plate studs 102 positioned in the upper end of arcuate groove 56 and at the right side of the horizontal groove 68 in the center plate. Spring 108 is in its expanded position tending to support the magnets secured to inner plate 52 and the plate itself in the up position. Studs 88 are positioned in the lower end of arcuate grooves 76 and vertical guideways 70.

When a downward pressure is exerted on rail 74 of center plate 50, center plate 50 moves downwardly in vertical alignment with grooves 60 of the outer plate; and inner plate 52 with its magnets attached moves slidingly arcuately downwardly and to the left with respect to the outer plate.

Center plate stud 98 moves downwardly with the center plate within its vertical groove 62 and urges camming lever 114 downwardly counter-clockwise about its center of rotation, that is, about stud 92. As the studway portion 118 moves down, the curvilinear edge 122 moves out of contact with head 132 of the lever.

Prior to moving out of contact with retaining arm 130, the curvilinear edge 122 comes into contact with head 132 and forces the retaining arm downwardly about stud 93. Simultaneously, stud 102 moves downwardly in arcuate groove 56 and forces arm 146 downwardly. Arm 146 has a left corner 162 at its top or upper end 151 which comes into contact with head 132 and the flat surface of end 151 pushes the head to the left until the upper lip of the V-shaped mouth of arm 146 snaps into place against the beak portion urging the hooked retaining head upwardly and locking the center plate against movement.

To move the center plate and its magnets back up into magnetizing position, a slight additional downward pressure is exerted on the center plate rail 74, and the mouth of part 146 moves out of contact with the beak. Spring 142 pulls head 132 downwardly and pivotally counterclockwise about stud 93 and the V-shaped spring 104 pushes the center plate back into its up position.

Having now described the invention, the manner in which it operates should be clear, however, for a better understanding of the invention, its mode of operation will be described briefly without numerical reference to parts.

Conventionally, magnetic filing cards are filed within trays having magnetic side rails adapted to induce magnetic poles into tabs of relatively thin pieces of soft iron inserted along the sides of the cards. The magnetic poles induced are sufficiently strong to cause adjacent cards in a designated section of the tray to fan-out or separate along their upper edges permitting the upper portions of the cards to be viewed and permitting removal of a particular card desired.

To increase the efficiency of the refiling operation, it is desirable to mark in some manner the spot from which a card is removed so that it may be refiled without difficulty in the exact spot from which it was taken. Heretofore, various methods have been provided for marking a refiling position such as by moving the permanent magnets outwardly on both sides of the tray away from the cards. The mechanism provided to move the permanent magnets were relatively convex and usually required an additional movement on the part of the operator.

Unexpectedly, it has been discovered that moving the magnet on one side of the tray away from the tabs on that side is sufficient to permit collapse of the cards from the fanned-out position so as to mark the position of the card removed from the filing tray.

The demagnetization assembly provided utilizes a continuation of the same movement required to remove a card from the tray. This movement downwardly demagnetizes one side of the cards. A slight outward movement of the fingers rearwardly and forwardly of the card to be removed causes the cards to collapse away from the card to be removed. The magnets on the side of the tray which has not been demagnetized attract the tabs of soft iron in the cards on that side and pull the cards against that side of the tray and hold the cards in a particular collapsed position.

In FIG. 1, an operator's hand is shown in position on a support rail of a demagnetization assembly, the rail supporting the hand of the operator. The operator's fingers are relatively free to pick out a particular card desired. As indicated, the cards are in a fanned-out position indicating magnets on either side of the tray are in a magnetizing position.

When a particular card desired is found, a slight additional movement downwardly by the operator on the rail depresses the support rail. An outward flick of the fingers on either side of the card selected collapses the cards. The magnets on the other side of the tray attract the card tabs to that side holding the cards in a collapsed position where a card may be easily refiled.

The demagnetization assembly includes means to hold the magnets on one side of the tray in the down position as illustrated in FIG. 4. Upon replacing a particular card in a marked spot, a slight additional downward pressure is exerted on the support rail, means holding the magnets on that side is released and the magnets automatically spring back into up position inducing magnetic poles in card tabs on that side of the tray. The cards fan out again where the operator may easily read the cards to select another card desired.

The demagnetization assembly is exceptionally well balanced longitudinally by reason of the particular combination of arcuate grooves and vertical and horizontal grooves or guideways. Thus, a downward pressure on any part of the support rail results in a smooth substantially horizontal movement of the plate downwardly into demagnetized position without binding. As should be apparent, smooth operation of the demagnetization assembly is essential to a trouble free and efficient operation.

For most filing operations, the embodiment of the invention illustrated is satisfactory. However, it has been found that where relatively short filing cards of relatively less than average height are to be stored in a tray, it is advantageous to use a relatively weaker permanent side magnet on the side of the tray away from the demagnetization assembly. A relatively weaker magnet is for instance, a thinner magnet, or a magnet positioned slightly further away from the cards than the magnets on the other side of the assembly, results in a better collapsing of the cards with the cards firmly held in collapsed position.

With larger cards of relatively greater height, magnets of about the same strength on both sides of the tray are desired for a smooth fanning action. With the shorter cards, utilization of magnets of the same strength on both sides of the cards may result in the induction of strong magnetic poles in the tabs on the one side of the cards; and after collapsing the cards, the poles induced in the cards repulse each other and the cards drift back into the fanned-out position.

It should be apparent that where it is desired to utilize a relatively longer filing tray, an additional set of complementary arcuate, horizontal and vertical grooves or slots may be utilized advantageously in the plates to ensure smooth movement of the demagnetization assembly.

Since many modifications of the invention described and illustrated in the various figures may be made, the invention should not be limited thereto. Thus, it is contemplated to cover any modifications as fall within the true spirit and scope of this invention by the appended claims.

The invention is hereby claimed as follows:

1. A file assembly comprising: a container having first and second spaced apart substantially parallel side wall means which are interconnected by a base wall to support a plurality of card members on which are mounted first and second spaced apart elements of a magnetizable material, said card members being located in said container with juxtaposed surfaces positioned in a series of filing planes extending transversely of said container; a first magnet means fixedly supported by said first side wall means adjacent to said first magnetizable element; a second magnet means attached to a movable mounting member supported by said second side wall means, said second magnet means having a longitudinal axis positioned in a mounting plane which extends perpendicularly to said filing planes; and actuator means connected to said mounting member for moving said second magnet means from a first position adjacent said second magnetizable element to a second position in which the longitudinal axis of said second magnet means is below said second magnetizable element, said second magnet means being moved from said first position to said second position with its longitudinal axis in said mounting plane, a magnetic field emanating from said first magnet means being substantially weaker than a magnetic field emanating from said second magnet means to facilitate manual collapsing of said card members from a fanned out position to mark a card filling location when said second magnet means is in said second position.

2. An assembly as set forth in claim 1 further including: latch means supported by said second sidewall means for locking said second magnet means in said second position, said latch means being selectively releasable by moving said actuator means.

3. A file assembly comprising: a container having first and second spaced apart sidewalls interconnected by a base wall; juxtaposed card means positioned in said container; first and second spaced apart elements of a magnetizable material mounted on said card means; a first magnet means fixedly supported by said first sidewall in a position adjacent to said first magnetizable element; a vertically movable mounting member supported by said second sidewall; second magnet means attached to said mounting member with a longitudinal axis extending lengthwise of said container; an actuator means connected to said mounting member for selectively moving said second magnet means from a first position adjacent to said second magnetizable element to a second position in which the longitudinal axis of said second magnet means is located below said second magnetizable element, said second magnet means being moved from said first position to said second position in a vertical path with the longitudinal axis of said second magnet means lying at all times in a vertical plane.

4. A file assembly as set forth in claim 3 further including; a latch means supported by said second sidewall to engage said mounting member for locking said second magnet means in said second position.

5. A file assembly comprising: a container having first and second spaced apart sidewall means interconnected by a base wall to support a plurality of card members on which are mounted first and second elements of a magnetizable material, said card members being movable from a first fanned out position to a second collapsed position; a first magnet means fixedly supported by said first sidewall means adjacent to said first magnetizable element; and a second magnet means attached to a movable mounting means supported by said second sidewall means, a first relatively weak magnetic field emanating from said first magnet means and a second relatively strong magnetic field emanating from said second magnet means; and an actuator means connected to said movable mounting means for moving said second magnet means from a first position adjacent said second magnetizable element to a second position wherein said second magnetizable element is substantially outside the second relatively strong magnetic field emanating from said second magnet means, whereby said card means may be manually moved from said first fanned out position to said second collapsed position when said second magnet means is in said second position.

6. An assembly as set forth in claim 5 wherein; said second magnet means is moved from said first to said second position with a longitudinally extending axis being positioned at all times in a vertically extending plane.

7. An assembly as set forth in claim 6 further including; a latch means supported by said second sidewall means for locking said second magnet means in said second position, said latch means being selectively releasable by depressing said actuator means.

8. A file assembly comprising: a container having first and second spaced apart substantially parallel sidewall means which are interconnected by a base wall to support a plurality of card members on which are mounted first and second spaced apart elements of a magnetizable material, said card members being located in said container with juxtaposed surfaces positioned in a series of filing planes extending transversely of said container; a first magnet means fixedly supported by said first sidewall means adjacent to said first magnetizable element; and a second magnet means attached to a plate member supported by said second sidewall means, said second magnet means having transverse and longitudinal axes positioned in a mounting plane which extends perpendicularly to said filing planes, and actuator means connected to said plate member for moving said second magnet means longitudinally and vertically relative to said container from a first position adjacent said second magnetizable element to a second position in which the longitudinal axis of said second magnet means is below said second magnetizable element, said second magnet means being moved from said first position to said second position with both its longitudinal and transverse axes in said mounting plane.

References Cited by the Examiner

UNITED STATES PATENTS

| | | | |
|---|---|---|---|
| 2,722,936 | 11/1955 | Mathiesen | 126—12 |
| 2,871,862 | 2/1959 | Mathiesen | 129—16 |
| 2,984,243 | 5/1961 | Mathiesen | 129—16 |

JEROME SCHNALL, *Primary Examiner.*